United States Patent
Hult et al.

(10) Patent No.: US 8,727,077 B2
(45) Date of Patent: May 20, 2014

(54) ELEVATOR BRAKE

(75) Inventors: Arttu Hult, Helsinki (FI); Mika Olkkonen, Hyvinkaa (FI)

(73) Assignee: Kone Corporation, Helsinki (FI)

( * ) Notice: Subject to any disclaimer, the term of this patent is extended or adjusted under 35 U.S.C. 154(b) by 724 days.

(21) Appl. No.: 12/777,363

(22) Filed: May 11, 2010

(65) Prior Publication Data

US 2010/0213016 A1 Aug. 26, 2010

Related U.S. Application Data

(63) Continuation of application No. PCT/FI2008/000122, filed on Nov. 7, 2008.

(30) Foreign Application Priority Data

Nov. 12, 2007 (FI) .................................. 20070856

(51) Int. Cl.
*F16D 51/00* (2006.01)

(52) U.S. Cl.
USPC ............. 188/74; 188/71.7; 188/71.9; 188/75; 188/76

(58) Field of Classification Search
USPC .................... 188/71.7, 71.9, 74, 75, 76, 186; 187/288, 351, 356; 403/408.1; 411/398, 539
See application file for complete search history.

(56) References Cited

U.S. PATENT DOCUMENTS

| | | | | |
|---|---|---|---|---|
| 893,297 A * | 7/1908 | Bassick | ............................ | 16/419 |
| 1,062,905 A * | 5/1913 | Gadd | ............................ | 411/539 |
| 1,646,932 A | 10/1927 | Rosenberg | | |
| 2,491,948 A * | 12/1949 | Berkovitz | ...................... | 187/288 |
| 2,652,132 A * | 9/1953 | Browning | ........................ | 188/75 |
| 2,792,080 A * | 5/1957 | Dunlop | ......................... | 187/288 |
| 2,871,994 A | 2/1959 | Ward | | |
| 2,914,138 A * | 11/1959 | Borden | .......................... | 187/288 |
| 3,072,423 A * | 1/1963 | Charlton | .......................... | 403/83 |
| 3,265,165 A * | 8/1966 | Stainken | ........................ | 188/166 |
| 3,894,617 A | 7/1975 | Wiecko et al. | | |
| 4,805,741 A * | 2/1989 | de Jong et al. | ........... | 188/1.11 W |
| 4,875,558 A * | 10/1989 | Berkhan et al. | ............... | 188/171 |
| 4,982,977 A * | 1/1991 | Shimada | ................... | 280/86.753 |
| 5,014,828 A * | 5/1991 | Baldassarre | .................. | 188/173 |
| 5,104,141 A * | 4/1992 | Grove et al. | ............. | 280/86.753 |
| 6,260,673 B1 * | 7/2001 | Mustalahti | ..................... | 188/186 |
| 6,302,416 B1 * | 10/2001 | Schmack | .................. | 280/93.512 |
| 6,374,964 B2 * | 4/2002 | Mustalahti et al. | ........... | 188/186 |
| 6,830,131 B2 * | 12/2004 | Mustalahti et al. | ............ | 187/254 |

FOREIGN PATENT DOCUMENTS

DE 12 88 376 B 1/1969
WO WO 2005/050051 A1 6/2005

* cited by examiner

*Primary Examiner* — Robert A Siconolfi
*Assistant Examiner* — Mahbubur Rashid
(74) *Attorney, Agent, or Firm* — Birch, Stewart, Kolasch & Birch, LLP

(57) ABSTRACT

The invention relates to an elevator brake, said elevator comprising a hoisting machine (1) provided with at least a frame part (2) and a traction sheave (3), and a brake drum (4) arranged to be rotatable with the traction sheave (3) and provided with a braking surface (5), and a brake (6) having an effect on the rotary motion of the traction sheave (3), said brake (6) comprising at least one brake block (8) provided with a braking surface, which brake block (8) has been arranged to act on the braking surface (5) of the brake drum (4) with a force directed substantially towards the braking surface (5). To allow adjustment of the size of the air gap (8a) between the braking surface of the brake block (8) and the braking surface (5) of the brake drum (4), the brake (6) is provided with at least one eccentric adjusting element (11).

12 Claims, 3 Drawing Sheets

ELEVATOR BRAKE

CROSS REFERENCE TO RELATED APPLICATIONS

Figure 1:
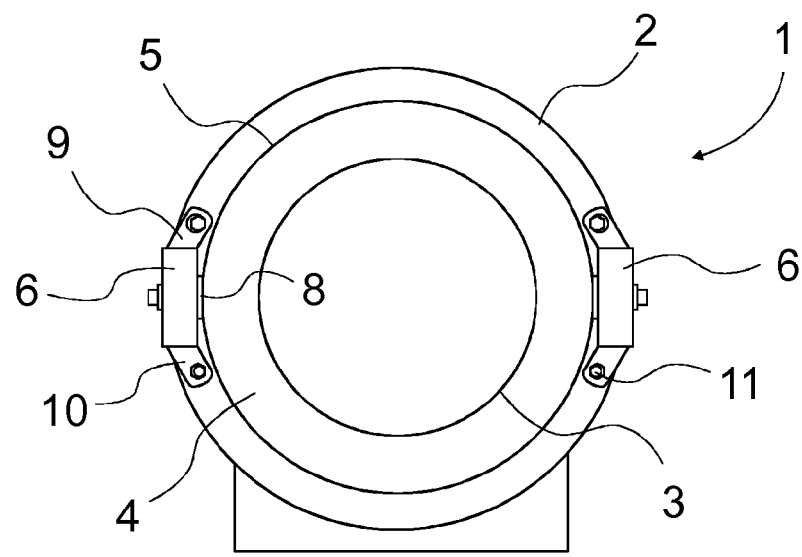

This application is a Continuation of PCT International Application No. PCT/FI2008/000122 filed on Nov. 7, 2008, which claims the benefit of Patent Application No. 20070856 filed in Finland, on Nov. 12, 2007. The entire contents of all of the above applications is hereby incorporated by reference into the present application.

The present invention relates to an elevator brake as described in the preamble of claim 1.

Elevators are generally provided with a holding brake, which is used to hold the elevator car stationary when the car is standing at a landing. This same brake is also often used as an emergency brake, which is required by elevator regulations and which is activated in the event of emergencies, such as electric power failures. The brake used may be e.g. a drum brake or a disc brake.

Traditionally, elevators use a drum brake, which comprises an active part provided with at least a brake block and an actuator for moving the brake block and, as a passive part, a brake drum attached to and rotating with the rotor of a hoisting motor comprised in the elevator hoisting machine, a braking surface being provided on the outer circumference of the brake drum. The operation of an elevator drum brake is generally such that, when the brake is in a closed position, a spring comprised in the active part of the brake presses a brake shoe and the brake block attached to it against the braking surface of the brake drum, thereby keeping the elevator car stationary. During travel, an electromagnet comprised in the active part of the brake is in an energized state and the magnet pulls the brake shoe and brake block clear of the braking surface of the brake drum, keeping the brake open and permitting the elevator car to move up or down in the elevator shaft. The elevator brake may be implemented e.g. by using a design that comprises two brakes serving as active parts, placed outside the circumference of the brake drum, on mutually opposite sides of the brake drum circumference as seen from the front in the direction of the axis of rotation of the brake drum.

When the brake is engaged, the force acting on the brake drum of the drum brake is relatively great, and consequently the brake wheel absorbs a great deal of kinetic energy. This produces a loud noise when the brake block hits the brake drum. An attempt to solve this problem has been to minimize the air gap between the brake block and the brake drum. In such a brake, the brake block can not reach a very high speed and kinetic energy by the moment it hits the brake drum, and consequently the impact is weaker. However, an air gap that is sufficiently small is difficult to implement and adjust, and such a solution leads to a quite sensitive construction and requires very accurate manufacturing tolerances. Another problem encountered in drum brakes is a defective orientation of the brake shoe and the movable parts of the electromagnet, which produces skewness in the air gap and additionally a load straining the other parts of the brake. This problem is particularly pronounced in the case of narrow brake drums.

The object of the present invention is to eliminate the above-mentioned drawbacks and to achieve an elevator brake that is easily and quickly adjustable, takes up as little space as possible and is as quiet as possible in operation. A further object is to achieve an elevator brake in which an adjustment has a substantially identical effect on the behavior of the brake regardless of the traveling direction of the elevator. The elevator brake of the invention is characterized by what is disclosed in the characterizing part of claim 1. Other embodiments of the invention are characterized by what is disclosed in the other claims.

Inventive embodiments are also discussed in the description part of the present application. The inventive content disclosed in the application can also be defined in other ways than is done in the claims below. The inventive content may also consist of several separate inventions, especially if the invention is considered in the light of explicit or implicit sub-tasks or with respect to advantages or sets of advantages achieved. In this case, some of the attributes contained in the claims below may be superfluous from the point of view of separate inventive concepts. Correspondingly, different details described in connection with each example embodiment of the invention can be used in other embodiment examples as well.

The solution of the invention has the advantage that even a small brake air gap can be adjusted easily and quickly. A further advantage is that the adjustment has the same effect regardless of the traveling direction of the elevator. Another advantage is that the stop faces in the brake body which are relevant to the size of the air gap can be made during manufacture by the same attaching operation, with the result that the stop faces are mutually parallel with a high accuracy. This permits more accurate adjustment while at the same time reducing the noise produced by operation of the brake, because the brake blocks hit the brake drum surface more smoothly. Yet another advantage is that the brake elements are substantially simple, from which it follows that the brake solution is economical to implement.

Figure 2:
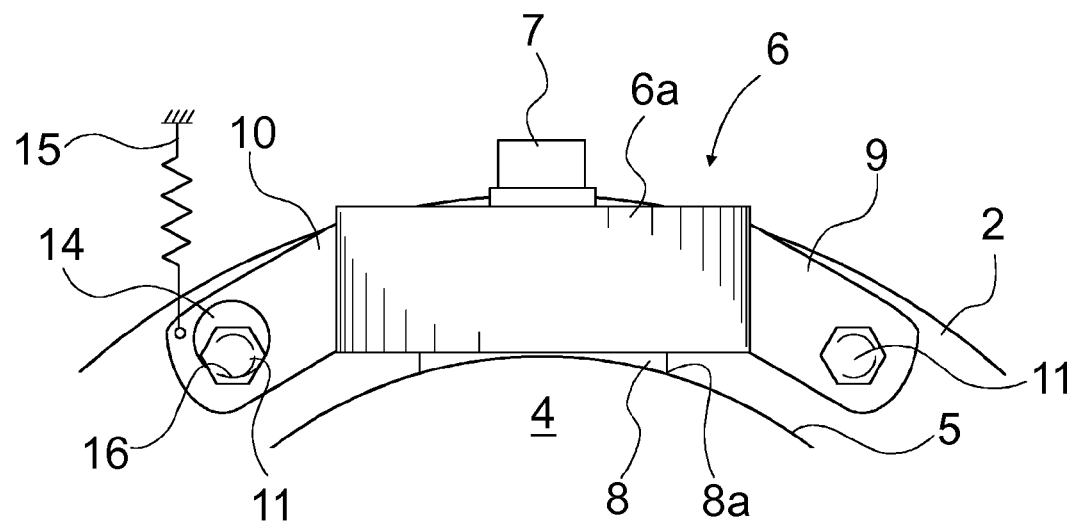
Figure 3:
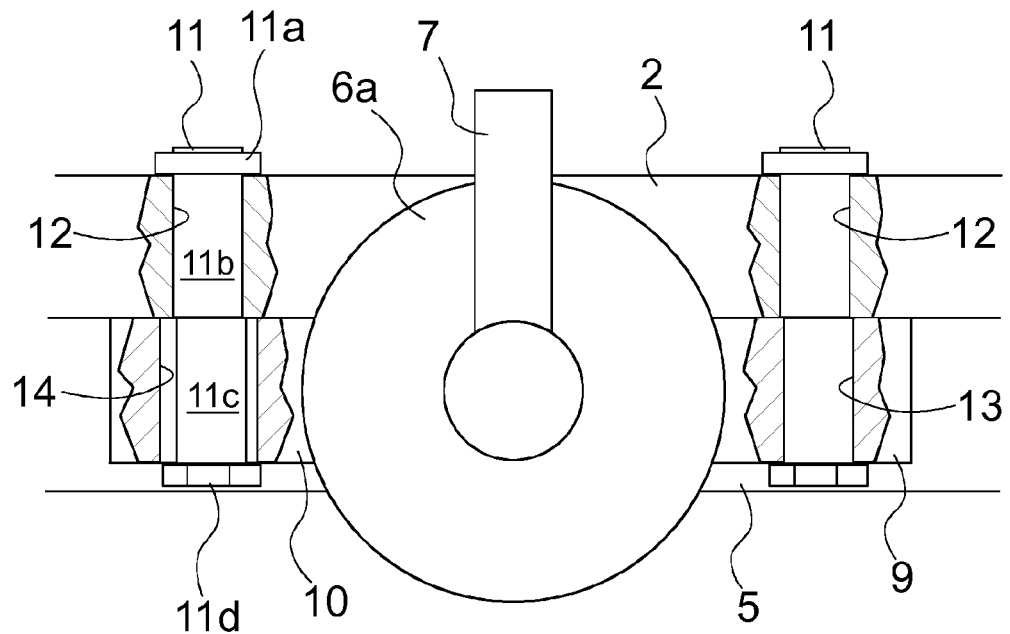
Figure 4:
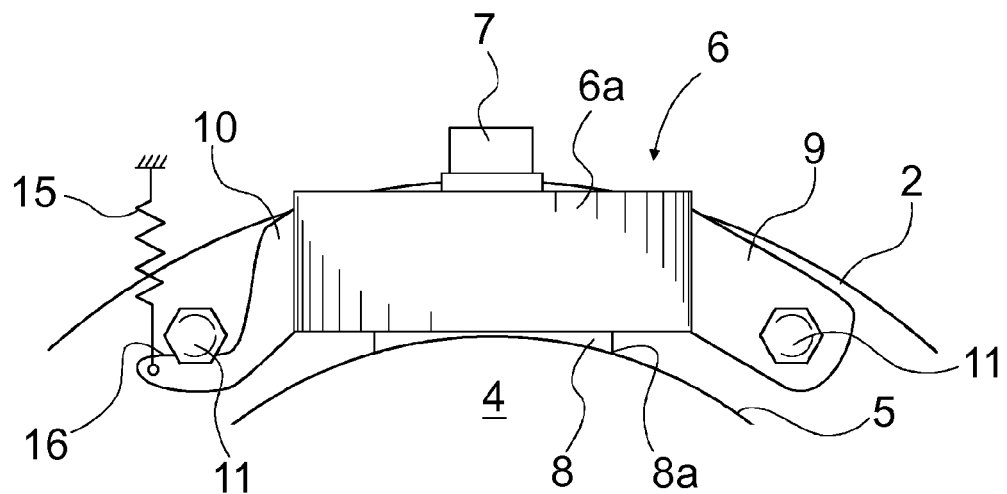
Figure 5:
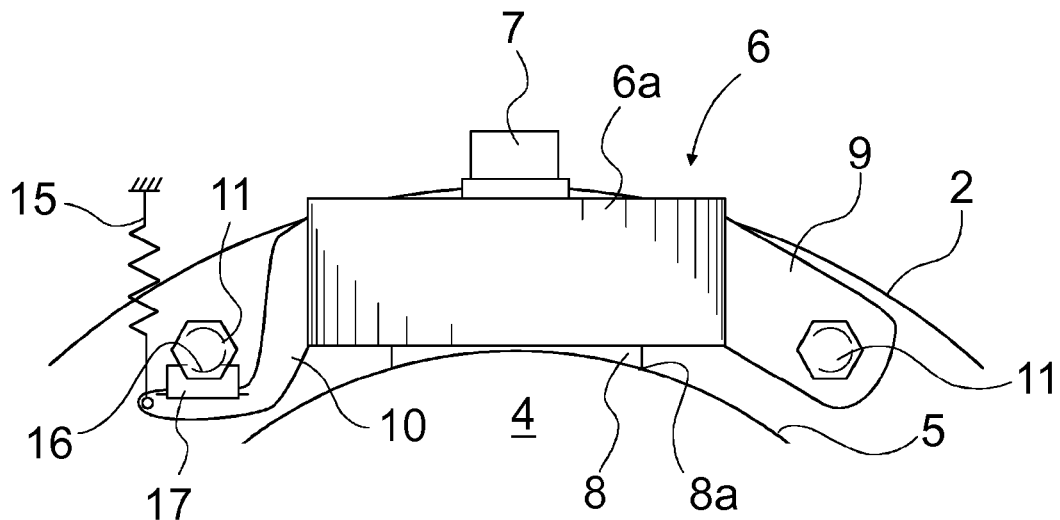
Figure 6:
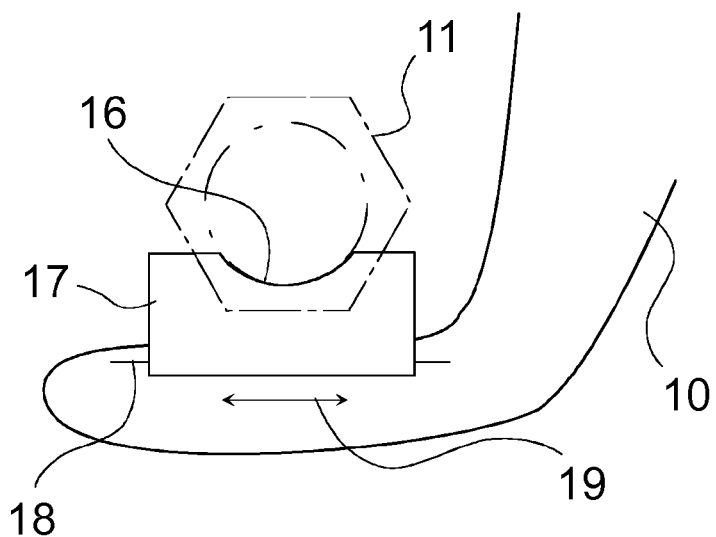

In the following, the invention will be described in detail by referring to different embodiment examples and the attached drawings, wherein FIG. 1 presents a diagrammatic and simplified front view of an elevator hoisting machine in which a brake solution according to the invention is used, FIG. 2 presents a lateral view of an elevator brake system according to the invention, FIG. 3 presents a partially sectioned front view of the elevator brake system according to FIG. 2, FIG. 4 presents a lateral view of a second preferred elevator brake system according to the invention, FIG. 5 presents a lateral view of a third preferred elevator brake system according to the invention, and FIG. 6 presents a lateral view of a magnified detail of one end of the brake system according to FIG. 5

In FIG. 1, an elevator hoisting machine 1 which uses a solution according to the invention is presented in a diagrammatic and simplified front view, i.e. as seen from the direction of the axis of rotation of the brake drum. The machine comprises at least a hoisting motor, which in the figure is hidden behind other components, a frame part 2 and a traction sheave 3 rotated by the hoisting motor. Attached to the traction sheave is a brake drum 4 provided with a cylindrical braking surface 5 and fitted to rotate with the traction sheave 3. The hoisting machine 1 additionally comprises at least brakes 6 fitted to produce a braking effect on the brake drum 4 by friction and disposed on the outer circumference of the brake drum 4 on mutually opposite sides of the brake drum 4 as seen in the direction of the axis of rotation of the brake drum 4. Each brake 6 is hingedly secured at least by one of its mounting brackets 9 or 10 e.g. to the frame part 2 of the hoisting machine 1. The securing and adjustment of the brake 6 are implemented using eccentric shafts 11, which serve as eccentric adjustment elements and are substantially parallel to each other, each brake 6 having two such shafts, disposed substantially symmetrically on either side of the brake 6 as seen in the direction of the center axis of the eccentric shafts 11. The center axis of the eccentric shafts 11 is substantially parallel to the axis of rotation of the brake drum 4.

Inside the body of the brake 6 are one or more compression springs, which have been fitted to press a brake block 8 of the brake, said brake block being provided with a braking surface, against the braking surface 5 of the brake drum 4 when the brake is engaged and is e.g. holding the elevator car immovable. Correspondingly, placed inside the body of the brake 6 is also one or more electromagnets, which have been fitted to pull the brake block 8 away from the braking surface 5 against the spring force pressing the brake block 8 and thus to release the brake when the elevator car is starting to move.

FIGS. 2 and 3 are diagrams representing an elevator brake system 6 according to the invention in a simplified and partially sectioned view. In FIG. 2, the brake is shown as seen from the front of the hoisting machine and turned through 90° relative to FIG. 1, and in FIG. 3 the brake is shown as seen from the side of the hoisting machine and turned through 90° relative to FIG. 1. In FIGS. 2 and 3, the frame part 2 of the hoisting machine is partially visible, and likewise the brake drum 4 and the braking surface 5 of the brake drum 4, whereas the hoisting motor and traction sheave are not shown in the figures.

The brake 6 comprises at least a hollow body 6a and mounting brackets 9 and 10, which are attached to the body 6a on mutually opposite sides of the body 6a and extend outward from the body 6a substantially in the direction of the plane of rotation of the braking surface 5 of the brake drum 4. When the brake is engaged, the brake block 8 is pressed against the braking surface 5 of the brake drum 4, but otherwise the brake block 8 and the braking surface 5 are separated by an air gap 8a. The brake 6 is hingedly secured by its first mounting bracket 9 to the frame part 2 of the hoisting machine 1 by means of an eccentric joint 11. Similarly, the second mounting bracket 10 of the brake 6 is provided with a substantially identical eccentric joint 11, which has been fitted in the through hole 14 of the second mounting bracket 10, the diameter of said hole being substantially larger than the diameter of the eccentric shaft 11. In addition, the brake comprises a spring element 15, which in this case is a draw-spring attached to the second mounting bracket 10 and arranged to pull the brake in a direction away from the braking surface 5 of the brake drum 4.

The two eccentric shafts 11 are mutually substantially identical. Provided at the first end of each eccentric shaft 11 is a flange 11a having a diameter larger than that of the shafts, the flange being fitted e.g. by threads to the first end of the first cylindrical part 11b of the eccentric shaft 11. The flange 11a serves to lock the eccentric shafts 11 and at the same time the brakes 6 in position. As an extension of the first cylindrical part 11b, the eccentric shaft has a second cylindrical part 11c, which is substantially parallel to the first cylindrical part 11b but whose center axis is, however, located at a distance from the center axis of the first cylindrical part 11b, so that the cylindrical parts 11b and 11c together form an eccentric shaft. In this example, the cylindrical parts 11b and 11c are equal in diameter, but they may just as well have unequal diameters. In addition, the second end of each eccentric shaft 11 has a hex head 11d or an equivalent form-locking element which can be used to rotate the eccentric shafts 11 about their center axis to adjust the size of the air gap 8a.

The frame part 2 of the hoisting machine 1 is provided with mounting holes 12, whose diameter has been adapted to correspond to the diameter of the first cylindrical part 11b of the eccentric shafts 11, so that the mounting hole 12 receives the first cylindrical part 11b. The first cylindrical part 11b fits in the mounting hole 12 as tightly as possible and substantially without clearance, but the cylindrical part 11b can still be rotated about its center axis by the hex head 11d when the eccentric shaft 11 is being rotated.

The first mounting bracket 9 of the brake 6 has a mounting hole 13, whose diameter has been adapted to correspond to the diameter of the second cylindrical part 11c so that the mounting hole 13 receives the second cylindrical part 11c. In this embodiment of the invention, the second cylindrical part 11c fits in the mounting hole 13 as tightly as possible and substantially without clearance, but still so that it can be rotated about the center axis of the first cylindrical part 11b by the hex head 11d when the eccentric shaft 11 is being rotated. This causes the mounting bracket 9 and consequently the brake 6 as a whole to be displaced by an amount corresponding to the rotated eccentricity of the eccentric shaft 11, while the frame part 2 remains immovable. The center axis of the mounting hole 13 lies substantially in the tangential plane of the point of contact between the brake block 8 and the braking surface 5, and consequently the braking force is substantially the same in both directions of rotation of the brake drum 4.

In another embodiment of the invention, a sleeve (not shown in the figure) is provided between the cylindrical part 11c and the mounting hole 13, so that the second cylindrical part 11c can be rotated in the mounting hole 13 by means of the sleeve.

Correspondingly, the diameter of the through hole 14 in the second mounting bracket 10 is substantially greater than the diameter of the second cylindrical part 11c of the eccentric shaft 11. The through hole 14 is so disposed in the mounting bracket 10 that the lowest point along its periphery, i.e. the point closest to the braking surface 5, is substantially level with the lowest point along the periphery of through hole 13, in other words, in each hole 13 and 14, the point closest to the braking surface 5 is located at a substantially equal distance from the braking surface 5. The brake drum-side portion of the periphery of through hole 14 forms a stop face 16, which has been fitted to be pressed against the second cylindrical part 11c of the second eccentric shaft 11 by the spring force of the spring element 15 acting substantially in a direction away from the braking surface 5. Correspondingly, the distance between the centers of holes 13 and 14 is substantially equal to the distance between the centers of the mounting holes 12 in the frame part 2 of the hoisting machine 1.

The brake 6 additionally comprises a releasing element 7 fitted to be mechanically operable, by means of which the brake can be released manually when no electricity is supplied to the brake.

FIG. 4 represents another elevator brake system 6 according to the invention as seen in lateral view. In this solution, all other parts of the brake 6 except for the second mounting bracket 10 are substantially identical to those in the solution represented by FIGS. 2 and 3. Instead of a through hole 14, the second mounting bracket 10 now has only a stop face 16 which opens in a direction away from the brake drum 4 and whose distance from the braking surface 5 has been adapted to be substantially equal to the distance of the closest point along the periphery of the mounting hole 13 of the first mounting bracket 9 from the braking surface 5 of the brake drum 4.

FIGS. 5 and 6 represent a third preferred elevator brake system 6 according to the invention as seen in lateral view. In this solution, too, all other parts of the brake 6 except for the second mounting bracket 10 and the associated auxiliary components are substantially identical to those in the solution represented by FIGS. 2 and 3. The second mounting bracket 10 is now provided with a separate, carriage-type or similar supporting element 17 arranged to be substantially linearly movable and functioning as a slipper pad, which has been fitted to be movable between the second eccentric shaft 11 and the second mounting bracket 10. The supporting element 17 has a substantially curved stop face 16 opening in a direction away from the brake drum 4. The distance of the closest point of said stop face from the braking surface 5 has been adapted to be substantially equal to the distance of the closest point along the periphery of the mounting hole 13 of the first mounting bracket 9 from the braking surface 5 of the brake drum 4. The stop face 16 of the supporting element 17 is so shaped that the surface pressure between the second eccentric shaft 11 and the supporting element 17 will be as small as possible in all adjustment positions of the eccentric shaft 11.

The second mounting bracket 10 is provided e.g. with guide tracks 18, along which the supporting element 17 has been fitted to slide in mutually opposite directions as indicated by arrow 19 due to the force exerted by the eccentricity of the second eccentric shaft 11 when the second eccentric shaft 11 is being rotated in connection with adjustment of the air gap 8a.

The air gap 8a of the brakes 6 presented in FIGS. 2-6 is adjusted in the same way in all the brake types according to the example. All these brake solutions have at least in the mounting hole 13 at the first end a substantially clearance-free eccentric shaft 11, which is rotatable about its center axis and serves as a means of adjusting the size of the air gap 8a, and at the second end a stop face 16, which has been fitted to be pressed by a spring element 15 against that surface of the second cylindrical part 11c of the second eccentric shaft 11 which faces towards the braking surface 5. Adjustment of the size of the air gap 8a has been adapted to be effected by rotating the eccentric shafts 11 by the hex head 11d. On the side of the first mounting bracket 9, the brake 6 is moved farther away from the braking surface 5 and closer towards the braking surface 5 by the force exerted by the eccentric motion of the second cylindrical part 11c of the eccentric shaft 11. Similarly, on the side of the second mounting bracket 10, the brake 6 is moved farther away from the braking surface 5 by the spring force of the spring element 15 when permitted by the eccentric motion of the second cylindrical part 11c of the eccentric shaft 11 and likewise moved closer towards the braking surface 5 when forced by the eccentric motion of the second cylindrical part 11c of the eccentric shaft 11 against the spring force of the spring element 15. In each brake solution, the brake 6 comprises two eccentric shafts 11 functioning as eccentric adjusting devices, one eccentric shaft being placed on either side of the brake block 8 as seen in the direction of the axis of rotation of the brake drum 4, i.e. relative to the direction of the plane of rotation of the braking surface 5.

It is obvious to a person skilled in the art that the invention is not exclusively limited to the example described above but that it may be varied within the scope of the claims presented below. Thus, for example, the fastening and structure of the adjusting elements may differ from those described above.

It is also obvious to a person skilled in the art that the first and second cylindrical parts of the eccentric shafts may differ from each other in diametric size, for example so that the second cylindrical part going through the mounting bracket is smaller in diameter than the first cylindrical part in the mounting hole of the frame part of the hoisting machine.

It is further obvious to a skilled person that the first and second cylindrical parts of the eccentric shafts may also differ from each other in diametric size so that the second cylindrical part going through the mounting bracket is larger in diameter than the first cylindrical part in the mounting hole of the frame part of the hoisting machine.

It is likewise obvious to a skilled person that the structure of the eccentric shaft may also differ from the structure described above so that the shaft itself is straight and has a substantially uniform thickness throughout its length but is provided with an eccentric sleeve placed on the cylindrical part going through the mounting bracket or on the cylindrical part in the frame part of the hoisting machine.

It is additionally obvious to a skilled person that, instead of an eccentric shaft, it is also possible to provide a wedge-shaped adjusting element or equivalent in conjunction with the second mounting bracket to allow adjustment of the air gap of the brake.

The invention claimed is:

1. An elevator brake, comprising:
   a hoisting machine provided with at least a frame part and a traction sheave;
   a brake drum arranged to be rotatable with the traction sheave and provided with a braking surface; and
   a brake configured to provide a braking effect on the rotary motion of the traction sheave, said brake comprising at least one brake block provided with a braking surface, said brake block being arranged to act on the braking surface of the brake drum with a force directed substantially towards the braking surface,
   wherein the brake is provided with a first eccentric adjusting element and a second eccentric adjusting element, arranged on a first end and a second end of the brake, respectively, to adjust size of an air gap between the braking surface of the brake block and the braking surface of the brake drum, and
   wherein the second eccentric adjusting element at the second end of the brake is placed in a substantially loose through hole whose diameter is substantially larger than the diameter of the second eccentric adjusting element, and wherein a portion of the periphery of the substantially loose through hole which lies closer to the brake drum directly contacts and bears against the second eccentric adjusting element to form a stop face for the second eccentric adjusting element.

2. The elevator brake according to claim 1, wherein the first and second eccentric adjusting elements are eccentric shafts, and the brake is hingedly secured to the hoisting machine by the eccentric shafts.

3. The elevator brake according to claim 2, wherein the two eccentric shafts are positioned on each side of the brake block relative to the direction of the plane of rotation of the braking surface.

4. The elevator brake according to claim 3, wherein the two eccentric shafts are substantially parallel relative to each other and at the same time also substantially parallel to the axis of rotation of the brake drum.

5. The elevator brake according to claim 3, wherein the brake has a mounting hole at a first end thereof, said mounting hole accommodating the first eccentric shaft in a substantially clearance-free manner, the first eccentric adjusting element being rotatable about a center axis thereof, and the brake has, at a second end thereof, the second eccentric shaft and the stop face, said stop face being configured to be pressed by a spring element against a surface of the second eccentric shaft which faces towards the braking surface of the brake drum.

6. The elevator brake according to claim 1, wherein the first eccentric adjusting element and the second eccentric adjusting element are positioned on each side of the brake block relative to the direction of the plane of rotation of the braking surface.

7. The elevator brake according to claim 1, wherein the first and second eccentric adjusting elements are substantially parallel relative to each other and at the same time also substantially parallel to the axis of rotation of the brake drum.

8. The elevator brake according to claim 1, wherein the brake has a mounting hole at a first end thereof, said mounting hole accommodating the first eccentric adjust element in a substantially clearance-free manner, the first eccentric adjusting element being rotatable about a center axis thereof, and the brake has, at a second end thereof, the second eccentric adjusting element and the stop face, said stop face being configured to be pressed by a spring element against a surface of the second eccentric adjusting element which faces towards the braking surface of the brake drum.

9. The elevator brake according to claim 8, wherein a center axis of the mounting hole lies substantially in a tangential plane of the point of contact between the brake block and the braking surface of the brake drum.

10. The elevator brake according to claim 1, wherein the adjustment of the air gap of the brake is configured to be performed by rotating the at least one of the first and second eccentric adjusting elements a center axis thereof.

11. The elevator brake according to claim 1, wherein the brake includes a mounting bracket configured to secure the brake to the frame part, the mounting bracket including a first through hole for accommodating the first eccentric adjusting element and a second through hole for accommodating the second eccentric adjusting element, the second through hole, being said substantially loose through hole, having a larger diameter than the first through hold.

12. The elevator brake according to claim 11, wherein the second parts of the first and second eccentric adjusting elements are accommodated in the first and second through holes of the mounting bracket respectively, and the first parts of the first and second eccentric adjusting elements are accommodated are accommodated in through holes provided in the frame part.

* * * * *